United States Patent [19]

Odom

[11] Patent Number: 5,781,632
[45] Date of Patent: Jul. 14, 1998

[54] METHOD AND APPARATUS FOR SECURED TRANSMISSION OF CONFIDENTIAL DATA OVER AN UNSECURED NETWORK

[76] Inventor: Gregory Glen Odom, 1705 E. Valley La., Grand Prairie, Tex. 75050

[21] Appl. No.: 961,386

[22] Filed: Oct. 30, 1997

Related U.S. Application Data

[63] Continuation of Ser. No. 385,697, Feb. 8, 1995, abandoned.
[51] Int. Cl.⁶ .................................................. H04L 9/32
[52] U.S. Cl. ........................... 380/24; 380/49; 705/26; 705/44
[58] Field of Search ........................ 380/24, 49, 25; 705/26, 34, 44

[56] References Cited

U.S. PATENT DOCUMENTS

| | | | |
|---|---|---|---|
| 4,881,263 | 11/1989 | Herbison et al. | 380/21 |
| 4,965,568 | 10/1990 | Atalla et al. | 380/24 X |
| 5,195,133 | 3/1993 | Kapp et al. | 380/9 |
| 5,283,829 | 2/1994 | Anderson | 380/24 |
| 5,475,757 | 12/1995 | Kelly | 380/24 |
| 5,715,314 | 2/1998 | Payne et al. | 380/24 |

OTHER PUBLICATIONS

Andreas Furche and Graham Wrightson, "Computer Money", 1996 dpunkt—Verlag fur digitale Technologie GmbH, ISBN 3-920993-54-3, section 5.6 'CARI'.

*Primary Examiner*—Gilberto Barrón, Jr.
*Attorney, Agent, or Firm*—Warren & Perez

[57] ABSTRACT

A method and apparatus that allows INternet users to purchase or order goods and services through the INternet by permitting the secured transmission of sensitive financial information. Messages are encrypted and locked with a randomly generated encryption key to which only the user has access. Furthermore, a unique customer number is assigned to each user for identification purposes. Encrypted messages are intercepted in-transmission by a switch which deencrypts the message and verifies that the request originated from an authorized customer and that the data string has maintained integrity. The request is then reencrypted with the intended recipient's unique encryption key and transmitted on the INternet to the recipient. The request may include sensitive customer credit information which may be routed to a merchant, financial institution or credit authorizer in order to make purchases or place orders through the INternet.

5 Claims, 6 Drawing Sheets

METHOD AND APPARATUS FOR SECURED TRANSMISSION OF CONFIDENTIAL DATA OVER AN UNSECURED NETWORK

This application is a continuation of application Ser. No. 08/385,697, filed Feb. 8, 1995 now abandoned.

TECHNICAL FIELD

The invention relates in general to the transmission of data over a network, and, more particularly to an apparatus and method for the secured transmission of sensitive confidential information over the INternet.

BACKGROUND OF THE INVENTION

Through the years, the INternet has become the information "superhighway" of choice for an ever increasing number of individuals who have turned to it as an inexpensive and effective way of transmitting electronic messages and other information. One reason for its increasing use is that the INternet has acquired universal appeal by providing widespread access from an unspecified number of terminals or other dial-in equipment around the world. In the United States, for example, popular information access services such as Prodigy, Compuserve and America Online advertise and promote access to the INternet as a way of attracting customers.

Another reason for the increasing popularity of the INternet is the overall low cost associated with its use. Normally, a user can setup an account for a nominal charge which provides him or her unlimited access to the INternet from any terminal having the appropriate communications means. In contrast, information access services normally charge a monthly user fee and require the use of proprietary communications software. Yet other information services charge a premium based on the total user access time during a given billing period.

Another reason why many individuals or organizations have turned to the INternet is the virtually endless ways in which a user can obtain access. Typically, a user with an established account can go to any terminal, whether it be dedicated, personal computer or networked, and enter the user's account information to send messages or browse an electronic mailbox to determine if the user has received messages from other users. Furthermore, there is no requirement that a user obtain access at a given site or location nor that a particular platform such as the IBM, DEC, Apple, UNIX or other be used.

While the flexibility, ease of access and low cost features associated with INternet use have attracted many users, these same features have caused worries regarding the openness and lack of security with regard to the information being transferred. For example, an individual user is normally limited in access only to the extent he or she has correct password and account/mailbox identifiers. In this regard, passwords and mailbox IDs can easily be acquired by other users or user groups who, in turn, may forward the same to others. Thus, the uncontrollable spread of passwords and account/mailbox identifiers permits unsecured access to most INternet data.

Additionally, the inherent openness of the INternet network permits unauthorized access to the vast traffic of electronic messages which flow from user to user throughout the network. In this regard, sophisticated users known as computer "hackers" can intercept the electronic messages during transmission and browse, print and/or otherwise steal the data contents. Also, advanced software and hardware devices can be designed and arranged to intercept specific data patterns which correspond to an authorized user's password and account/mailbox identifiers.

The security problems become more critical when the information being transmitted is highly sensitive and confidential. Examples of such information include a person's credit card number, savings or checking account number or the like. Traditionally, it has been this concern for information security that has kept mainstream vendors and merchants from placing their goods and services for order on the INternet. Should the user wish to place an order or make a purchase on the INternet, the user is in essence leaving "carbon" copies of his credit and/or debit history behind for hackers to read, record and use in the future.

Various methods have been proposed to increase the overall security and integrity of the data transmission process. One method involves encryption of the data stream prior to transmission. Encryption involves scrambling the data stream so that the information is uncipherable and unintelligible to anyone who may intercept the data during transmission.

A commonly used encryption method is the Data Encryption Standard (DES) as set forth in Federal Information Processing Standards Publications (FIPs-PUB)-46 (1977). Normally, a DES based algorithm and secret Key are used by a message sender to encrypt the data prior to transmission. Once the data stream arrives at its intended destination, the DES and Key are then used by the recipient to deencrypt the data into an intelligible form. The Key often consists of a 64-bit combination of data which can be interpreted as 16 hexadecimal characters (0–9, and A–F).

Where DES encryption is used, the security of encrypted transmissions is based entirely on the integrity of the Key generation and distribution process so that the probability that an unsophisticated user would gain access to the information is low as long as the Key is kept confidential and within the hands of authorized users. Recently, however, advances in technology coupled with public knowledge regarding DES, have made it easier for sophisticated users and computer hackers to decipher the 64-bit Key sequence directly from the data stream. In other circumstances, a hacker will transmit an endless amount of "dummy" strings until an acknowledgment is received verifying that the corresponding "dummy" Key will provide access to legitimate future transmissions. Still in other circumstances where the Key is part of a software application, an individual can simply copy the software to another location and thus gain perpetual and unlimited access to future transmissions.

Another encryption method involves the use of the RSA algorithm. In operation, an RSA-based program will generate two large prime numbers hundreds of digits long and produce both a "public" key and a "private" key from the numbers to allow encryption and deencryption of electronic messages, respectively. However, RSA encryption has not been popular since the generation and distribution of keys has made it difficult to manage on a widespread basis. Specifically, in an INternet environment where the handling of many transmissions and many users is critical, the use of RSA based programs is impractical.

Prior art systems have been developed to address the problems associated with the secure transmission of data over a network. For example, one approach is the End-To-End Encryption System and Method of Operation disclosed in U.S. Pat. No. 4,578,530 to Zeidler. The '530 patent relates to a method of transmitting DES encrypted Personal Identification Numbers (PIN) for use in conjunction with Automated Teller Machines (ATM) where a user's PIN and other account information are input by a combination of a magnetic strip on a plastic card and by keyboard entry.

However, while the '530 patent operates to increase system security in a network environment involving ATMs, it is not well suited for the electronic transmission of messages on the INternet where PINs and magnetic cards are unknown elements. Furthermore, while in operation the '530 relies on financial institutions to provide their clients with a specific PIN and magnetic card, it does not address the difficulties of distributing and generating unique Keys for INternet users. Moreover, the '530 invention fails to examine or process the data stream during transmission, and thus, there is no way to verify if it originated from an authorized sender or is intended to reach an authorized recipient.

Another approach for dealing with network security is disclosed in U.S. Pat. No. 4,881,263 to Herbison et al. The '263 patent describes a method of achieving secure data transmissions over an Ethernet network using DES. However, the '263 patent also fails to account for the generation and distribution features necessary to accomplish secured transmission on the INternet. Furthermore, the '263 patent does not address the security concerns which permit sophisticated users and computer hackers to decipher the data stream being transmitted over an open network such as INternet and does not disclose any in-transmission examination or processing of the data stream.

Specifically, none of the conventional prior art systems provide for a reliable and secured method of transmitting sensitive financial information from sender to recipient. Conventional prior art systems also fail to provide for a highly confidential key generation and distribution process which assures that only authorized users can encrypt and deencrypt transmissions from sender to recipient. Furthermore, the prior art systems fail to evaluate the data stream at a point prior to reaching its intended receiver to determine if a valid user request has been transmitted or if a valid recipient has been indicated. These and other limitations of the prior art systems sacrifice the integrity and security of the end-to-end transmission of data.

Moreover, prior systems fail to provide a processing means for evaluating the validity of the request prior to reaching its intended recipient. Until the present invention there was no way of determining if a particular transmission violated a predetermined user account limit, transaction type or number. Furthermore, because prior systems fail to provide any sort of in-transmission processing of the data stream, there is no way of alerting users if security concerns exist.

SUMMARY OF THE INVENTION

The present invention solves many of the problems identified above by providing a method and apparatus for secured transmissions of sensitive and confidential information on the INternet network. In this regard it is an object of the present invention to provide a system which generates and distributes a uniquely identified encryption key for each user on an off-network basis.

A further object of the present invention is to provide a data switch which receives the encrypted data string in order to examine and process the string and thus provide a security check of the information prior to transmittal to the intended recipient.

Yet another object of the present invention is the ability to match the particular deencrypted data string to its intended recipient and reencrypt the information with the recipient's unique encryption key prior to transmittal.

Still another object of the present invention is to provide an data string processor which performs a series of specified validity checks on the received data string to determine if any possible security concerns exist.

And still another object of the present invention is to provide for the transmission of sensitive financial information over the INternet by using a combination of encryption, compression and verification techniques to allow the request of goods or services from merchants, financial institutions, utility companies and others in a secured data environment.

BRIEF DESCRIPTION OF THE DRAWINGS

Other aspects of the invention and its advantages may be appreciated with reference to the following detailed description taken in conjunction with the appended drawings in which.

DETAILED DESCRIPTION OF THE PREFERRED EMBODIMENT

The present invention relates to a method and apparatus for allowing INternet users to achieve secured transmissions of sensitive confidential information by permitting such users to place product and service orders or pay bills whereby users select options available to them by transmitting an encrypted data string which is intercepted by a switch. The switch processes, verifies and retransmits the message to its intended recipient. The method employed provides a combination of off-network and on-network security measures permitting users to safely transmit credit card or debit card information on the INternet.

Figure 1:
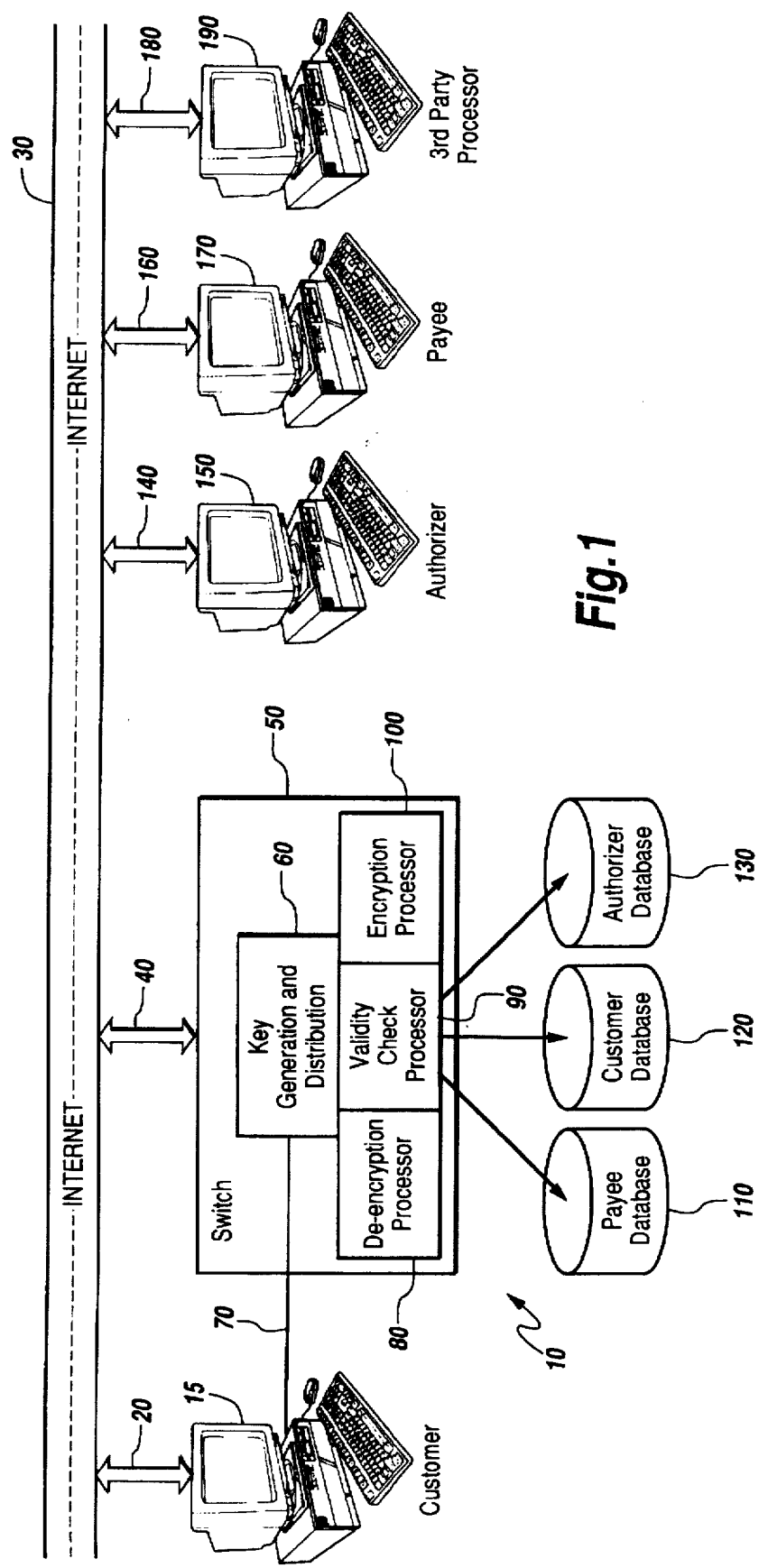
FIG. 1 is a block diagram depicting the overall system in accordance with the present invention.

The overall system employed in the preferred embodiment of the present invention is best understood by reference to FIG. 1. FIG. 1 shows that secured financial transaction system 10 comprises one or more customers 15 which have access means 20 to the INternet highway 30 via a communications link such as a modem, dedicated line, trunk, network or similar type device or apparatus. INternet highway 30 comprises the established network transmission lines, routers, computers, and other devices which users may use to accomplish communications with the Transmission Control Protocol/INternet Protocol (TCP/IP). Customer 15 is presented with a variety of INternet options which allow him to communicate with other users by transmitting messages along the INternet highway 30.

In operation, when the customer 15 desires to place an order for a particular good or service available through the INternet 30, customer 15 transmits an encrypted request along the INternet 30 which is intercepted by switch 50 in transmission. Switch 50 comprises key generation and distribution processor 60, deencryption processor 80, validity check processor 90 and encryption processor 100. Switch 50 also maintains a variety of local repositories including payee database 110, customer database 120, and authorizer database 130. An off-network pathway 70 allows a transfer of secret encryption key and other information from key generation and distribution processor 60 to customer 15. Off network pathway 70 may include but is not limited to dedicated secured line, bonded mail service, express delivery service or the like.

Deencryption processor 80 receives the customer's 15 encrypted request via access means 40 which in the preferred embodiment is a modem line, dedicated leased line, trunk or similar communications pathway. The deencryption processor 80 deencrypts the customer request to obtain a intelligible message. The message is forwarded to validity check processor 90 which performs various security checks, such as ensuring the integrity of the message and data string. Validity check processor 90 employs payees database 110, customer database 120 and authorizer database 130 in order to determine that an appropriate payee, customer, and/or authorizer have been included in the request. An inappropriate request is rejected by validity check processor 90 and logged by switch 50 as an error. Appropriate requests are kept for further processing.

Where an appropriate request has been received, validity check processor 90 will forward the request to the indicated recipient which may be an authorizer 140, payee 170, or third party processor 190 via INternet 30 and access means 40. Prior to transmission, the encryption processor 100 will encrypt the message using the secret encryption key and other unique information corresponding to the indicated recipient.

An encrypted message intended for authorizer 150 is received via access means 140. In the preferred embodiment, authorizer 150 is an independent organization which verifies credit and debit information as well as the availability of funds for a given customer account.

An encrypted message intended for payee 170 is received via access means 160. In the preferred embodiment, payee 170 is any organization which will accept financial transactions such as a merchant, financial institution, service provider and the like.

An encrypted message intended for third party processor 190 is received via access means 180. In the preferred embodiment, third party processor 190 is an independent organization that provides additional financial services such as accepting payments for utility companies or other institutions not capable of accepting payment on a credit basis.

Once the encrypted message has been received by the intended recipient, the authorizer 150, payee 170 or third party processor 190 deencrypt the message using unique encryption keys to obtain an intelligible message which can be processed. Authorizer 150, payee 170 and third party processor 190 will respond with an encrypted acknowledgment of receipt via access means 140, 160 and 180, respectively.

Figure 2:
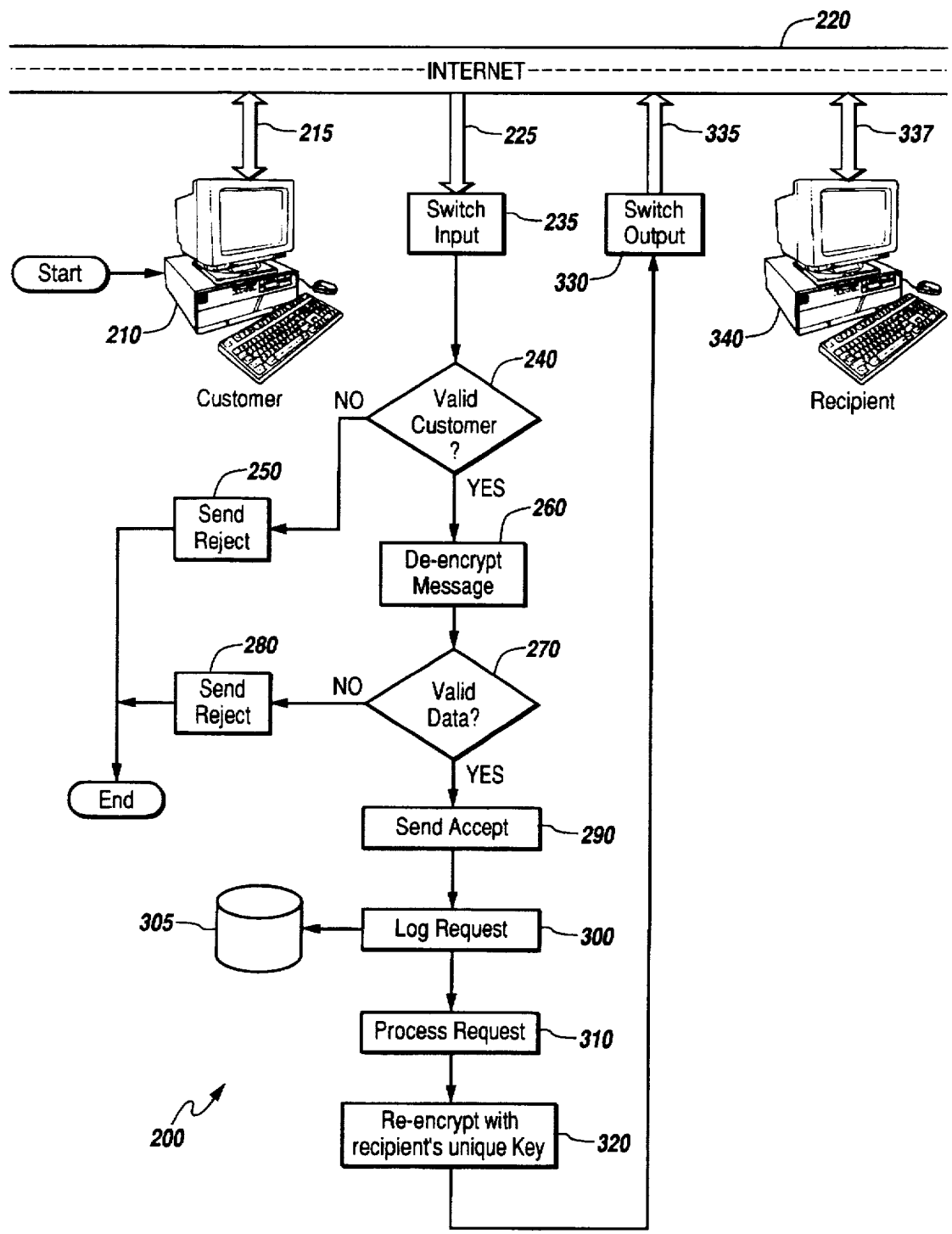
FIG. 2 is flow diagram of the secured financial transaction process in accordance with the present invention.

Reference is now made to FIG. 2, which illustrates the financial transaction process in accordance with the present invention. Process flow begins when one or more customers 210 transmit an encrypted message via access means 220. The encryption method may vary, but in the preferred embodiment is similar to the DES and may include encryption of characters other than the conventional "0–9" and "A–F" such as "(","")", "+", "&", etc. . . . Furthermore, in the preferred embodiment the message is also compressed prior to transmission.

Switch input 230 receives the encrypted message from customer 210 via access means 225. Process flow continues to determine if a valid customer has sent the message 240. In the preferred embodiment, customer validation involves verifying a customer's electronic mailbox address and comparing it to an established customer account to determine if a valid customer has transmitted the message. Validation also involves comparing an encrypted customer number to a clear number attached to the message to verify a match. Invalid customer messages are rejected 250.

Where a valid message has been received, the message is deencrypted 260 and the message data checked to determine its validity 270. In the preferred embodiment, message data is valid when it includes an indication corresponding to an appropriate payee, authorizer or third party processor. Valid message data also conforms to a given customer's velocity file which contains parameters limiting the requested financial transaction. Such parameters define limits on the transaction dollar amount, transactions per day, number of transactions per credit account and the like. It should be understood that other limits may be specified by the customer and maintained in the customer's velocity file.

Invalid request data causes the request to be rejected 280. Where the request is valid, a message of acceptance is transmitted 290 to the customer 210 and the request logged 300 in a customer history file 305. Alternatively, where the customer has transmitted a payment request the customer can inquire on the status of his request. The request continues to be processed 310 in accordance with the method disclosed. The message is reencrypted with the intended recipient's secret encryption key 320 before transmission on the INternet highway 220 via switch output 330 and access means 335. Process flow ends when the reencrypted message is received by the intended recipient 340 via access means 337.

Figure 3:
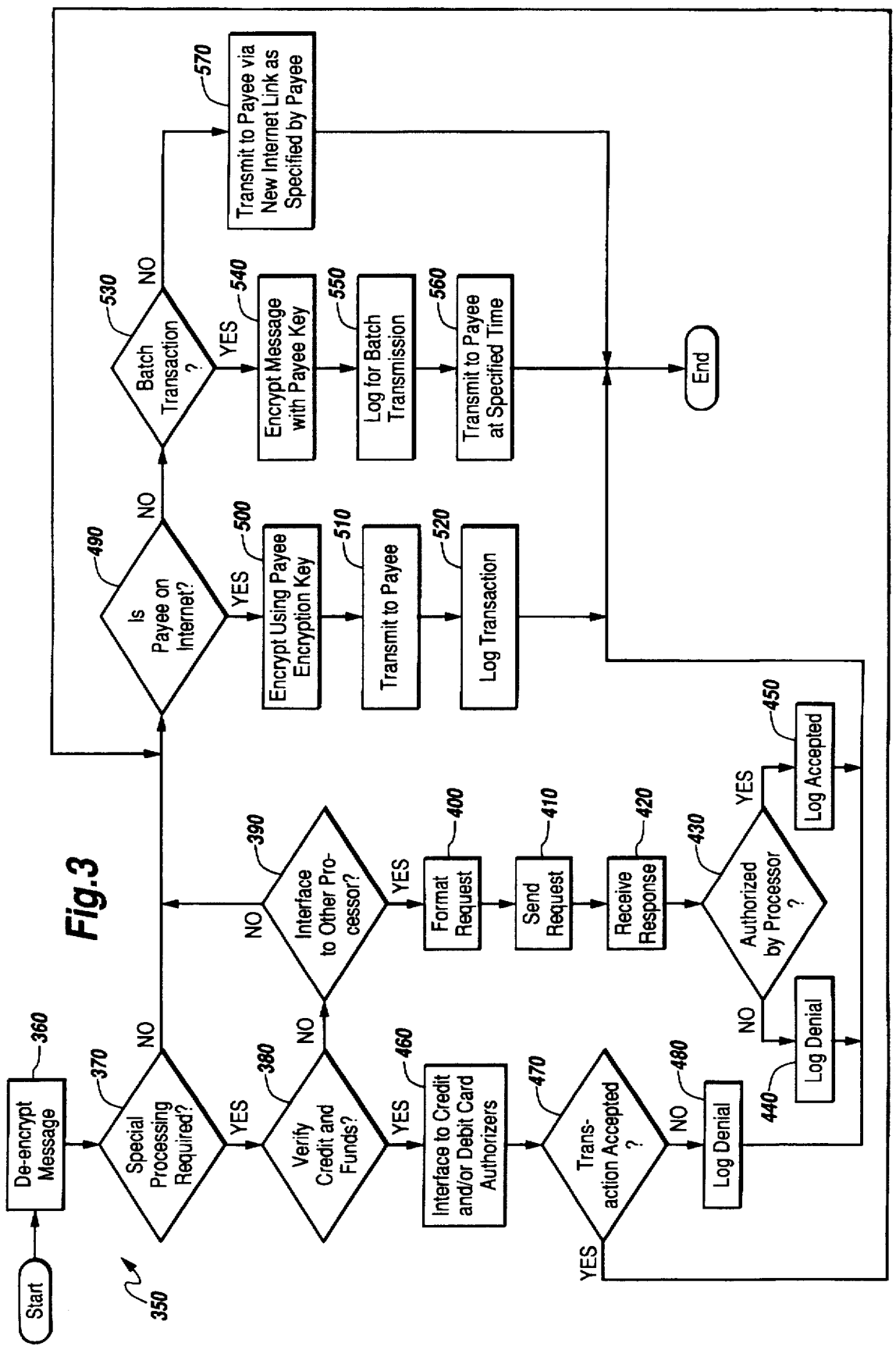
FIG. 3 is a flow diagram of financial processing functions in accordance with the present invention.

The financial processing functions provided by the present invention are best understood by reference to FIG. 3. FIG. 3 shows that a deencrypted message 360 is examined to determine if special payee processing is required 370. If special processing is required, process flows to determining whether the indicated payee demands credit and fund authorization 380 or whether an interface to an independent processor 390 is necessary. While authorizations and independent processors are two ways in which a customer request is processed, it should be readily understood by one skilled in the art the other types of special processing may be used depending on the type and purpose of the request.

Where an independent processor is required, process flows to formatting a processor request 400 which is transmitted to the processor 420 via the INternet in an encrypted format. A response is received from the processor 430 either accepting or denying the customer's original request. Denials and acceptances are logged 440, 450, respectively to create or update the customer's transaction history.

Where an authorizer is required, process flow is directed to interfacing with the appropriate credit or debit account institution 460 which involves forwarding an encrypted message containing the customer's request via the INternet or other communications means. At this point, the transaction is either accepted in which case process flows to determining if the appropriate payee is on the INternet 490 or the transaction is denied in which case the denial is logged 480 to create or update the customer's transaction history. As disclosed herein, the authorization process works similar to conventional point-of-sale devices used to verify the credit status of a customer.

Where payee special processing is not required or when a credit and or debit transaction has been authorized, process flow is directed to determining if the payee is on the INternet 490. If the payee has an established account and is on the INternet, the customer request is encrypted using the payee's secret encryption key 500 and the encrypted message is transmitted to the payee 510. The transaction is logged 520 to create or update a customer history file.

If the payee is not on the INternet, then process flow continues to a determination of whether the request is part of a periodic batch transaction 530 wherein customer requests are transmitted to the payee as part of a periodic transmission process. If batch processing is required, the customer's request is encrypted along with the payee's secret encryption key 540 and logged for batch transmission 550. At the appropriate transmission time, the encrypted message is transmitted to the payee 560.

Figure 4:
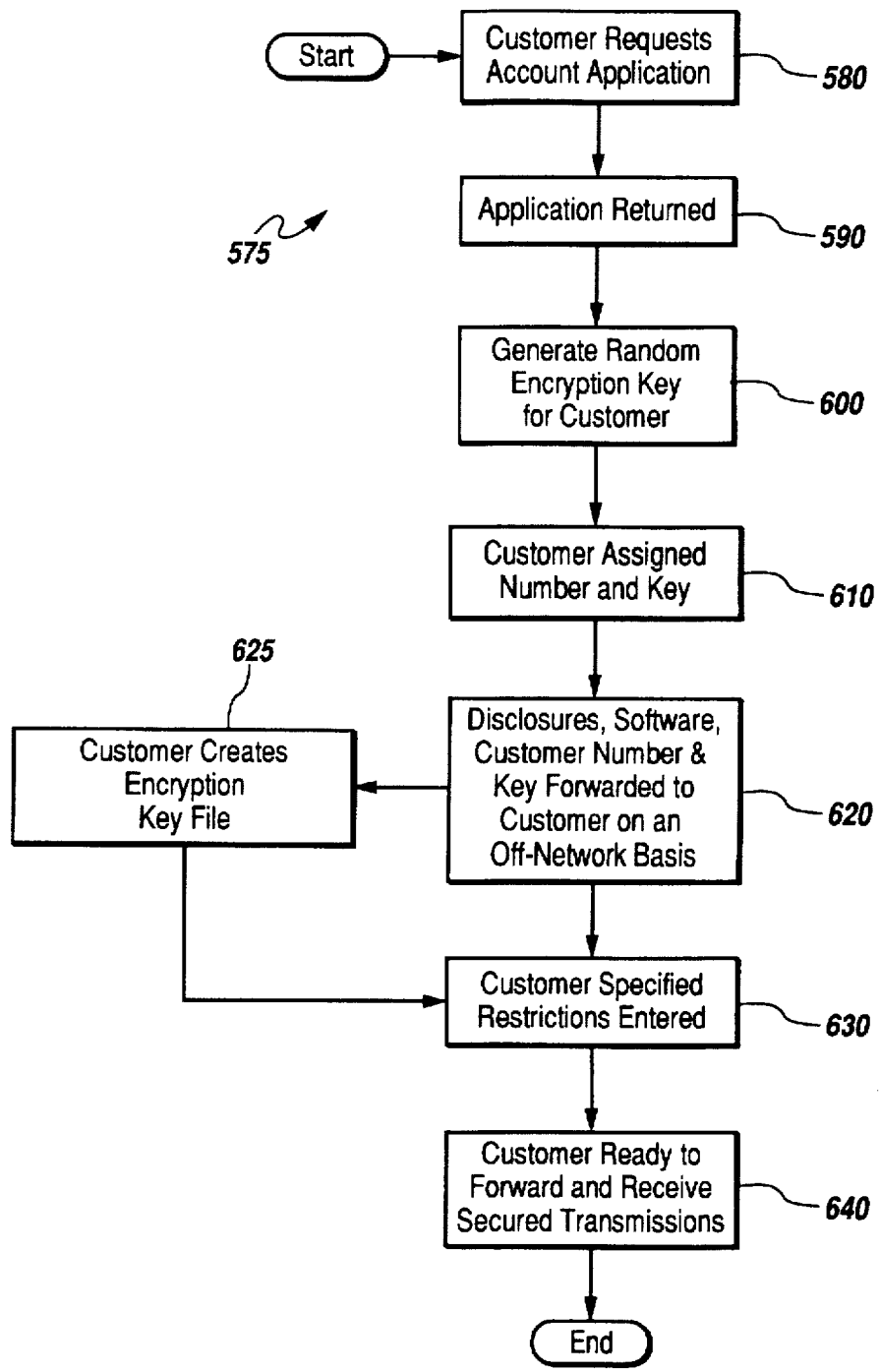
FIG. 4 is a flow diagram illustrating the security setup process in accordance with the present invention.

FIG. 4 demonstrates the security setup process used to ensure reliable and secured transmissions of information in accordance with the preferred embodiment of the present invention. Process flow begins when the customer requests an account application 580 from the switch administrator. An application is forwarded to the prospective customer and the customer, in turn, returns 590 the completed application to the administrator via electronic exchange, mail service or similar delivery method. Next, the switch generation and distribution processor 60 generates a unique random encryption key 600 for the customer. The customer is also assigned a unique customer number 610. Alternatively, it should be understood by one skilled in the art, that a unique encryption key and customer number may be preassigned to an unknown customer to allow the customer to subsequently transmits his name, mailbox address and other like information via a secured message.

Process flows continues wherein the customer number, encryption key, application software and other disclosures are forwarded to the customer on an off-network basis 620 ensuring that no other person has access to the encryption key. Upon receipt, the customer installs the software on his platform of choice such as on an IBM personal computer, Apple, or similar device. The customer uses the software to assign a name to a special file 625 that contains the encryption key. In this way, unauthorized users are prevented from accessing the encryption key since only the customer knows the name of the file where it is contained. As an additional safeguard, the customer may encrypt the special file using a second encryption key only known by the customer.

Process flow continues wherein the customer can specify restrictions he or she wishes to place on financial transactions 630. Such restrictions include but are not limited to, specifying a maximum dollar amount per transaction, a maximum number of transactions per day or other cycle, a limited number of transactions per credit or debit account as well as other limitations. The restrictions are forwarded to the switch 50 and entered into customer file 630. At this point the customer is ready to transmit and receive secured transmission 640.

Figure 5:
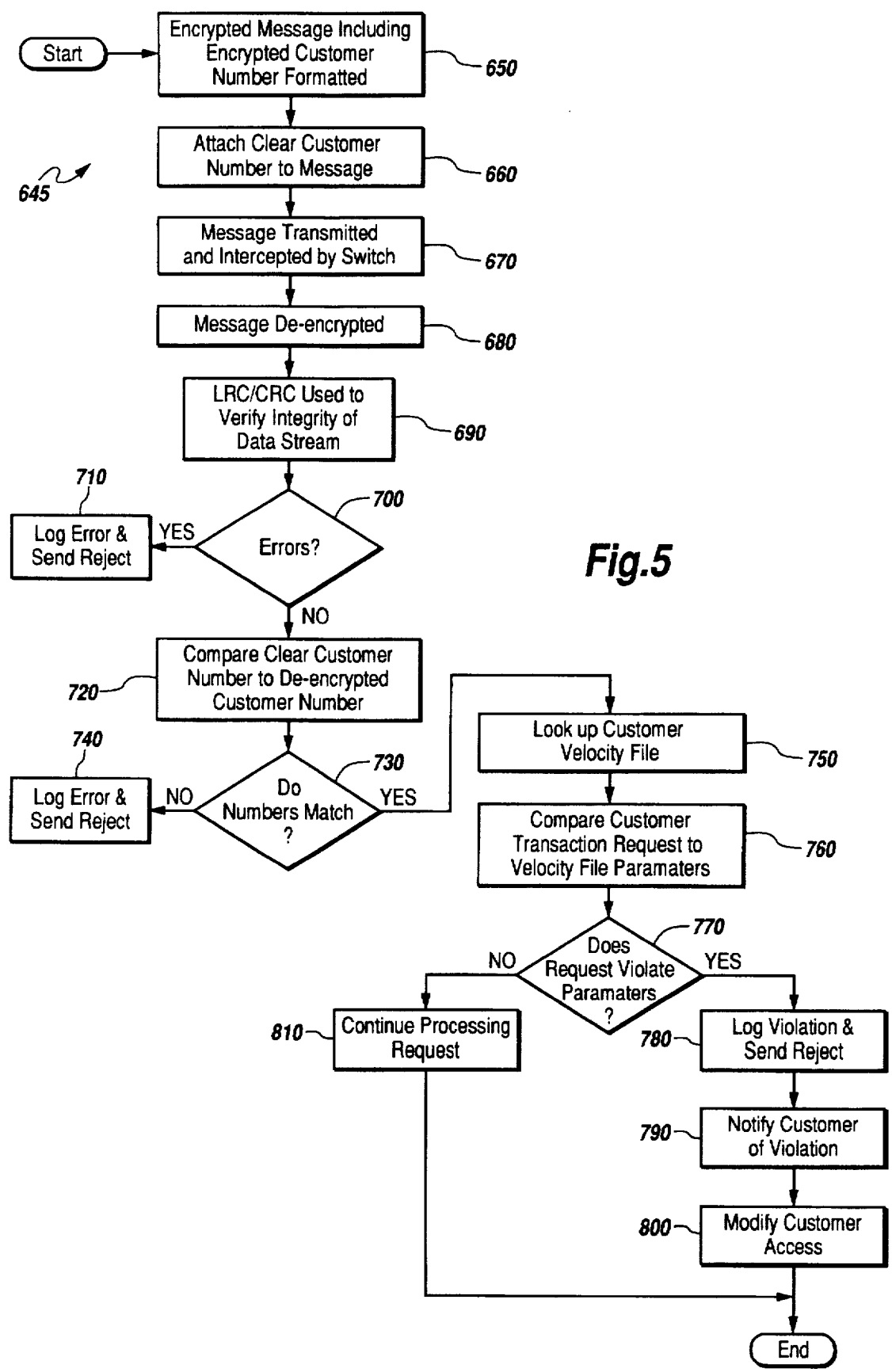
FIG. 5 is a flow diagram of the system security measures in accordance with the present invention.

Reference is now made to FIG. 5 which illustrates the varying levels of security measures 645 employed by the present invention. FIG. 5 shows that an encrypted message combines the customer's unique number in encrypted format 650 with the customer number attached in clear format 660 to allow the switch to identify the appropriate customer without deciphering the customer's encryption key. The formatted message is transmitted on the INternet and subsequently intercepted by the switch 670 before deencryption 680.

Process flow continues to verifying the integrity of data by performing techniques such as Longitudinal Redundancy Checks and Cyclical Redundancy Checks 690 on the data bit stream. Any errors 700 detected are logged by the switch and cause a reject message to be transmitted to the customer 710. Where the data string is error free, another level of security is performed wherein the customer number in clear format is compared to the encrypted customer number 720 to verify 730 the numbers match. An error is detected whenever the numbers do not match and if an error is detected the error is logged and a rejection message sent to the customer 740.

Where the numbers do match, process flow continues to retrieving the customer's velocity file 750 whenever one exists for the customer. At this point, the customer's transaction request is compared against existing velocity file parameters 760 to ensure the request does not violate any customer specified transaction limits.

Should the request violate customer specified transaction limits, the violation is logged and a rejection message forwarded to the customer 780. Furthermore, the customer is notified of the violation 790 and the customer's future access modified 800 on request. Such modification may include the generation of a new encryption key and assignment of a new customer number.

In the event no violation of customer specified customer limits has occurred, the request receives further processing 810 in accordance with the method of the present invention.

Figure 6:
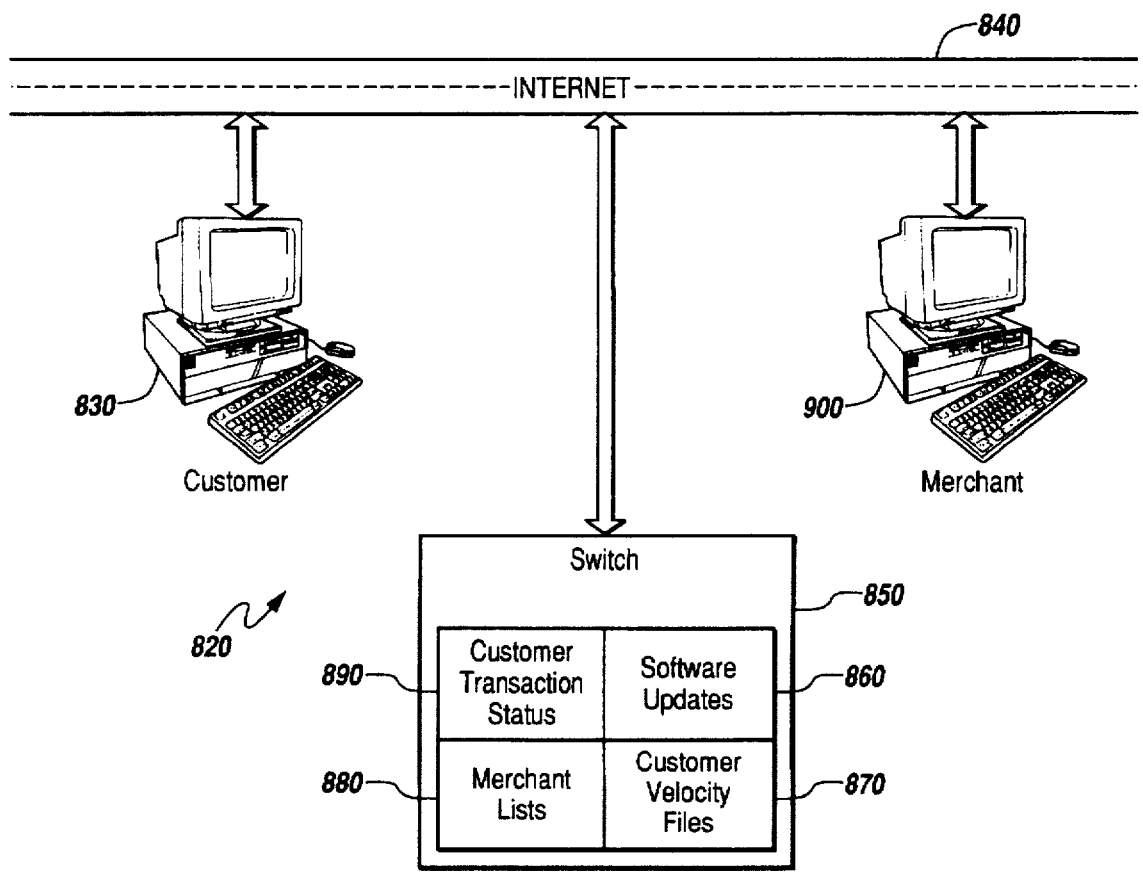
FIG. 6 is a block diagram illustrating various customer service options in accordance with the present invention.

Reference is now made to FIG. 6 which shows an overview of the customer service options 820 in accordance with the present invention. A customer 830 using the INternet highway 840 can transmit requests to switch 850 to inquire as to the status of a customer transaction 850, obtain an software updates 860 or an updated merchant list 880. Additionally, a customer's 830 velocity file 870 is stored in switch 890 to allow the customer 830 to specify or modify transaction parameters. Merchant 900 may also take advantage of service options 820. It should be understood that other service options may be requested from switch 890.

In the detailed description of the preferred embodiment reference is made to the appended drawings which form a part hereof and in which is shown by way of illustration a single embodiment in which the invention may be practiced. It is to be understood that other embodiments may be utilized and changes may be made to both the method and the architecture without departing from the true scope and spirit of the present invention.

We claim:

1. Over a network where unique encryption keys are forwarded to users on an off-network basis, said encryption keys being randomly generated and assigned to said users by an automated processing system, said encryption keys having corresponding unique customer numbers assigned thereto, a method of securely transmitting a customer request for goods or services to a merchant via an intermediary switch, the method comprising the steps of:

(a) encrypting the customer request, customer number and encryption key and electronic address of at least one merchant to create an unintelligible electronic message;

(b) attaching the customer's unique number in clear format to the unintelligible message to create a message request;

(c) accessing the network;

(d) transmitting the message request to the switch via the network;

(e) verifying the integrity of the message request by performing a bit stream check on the message request data stream;

(f) logging any errors found in the message request data stream;

(g) de-encrypting the message request if it is error free to reveal the customer request, the encryption key, the customer number and the electronic address of the merchant;

(h) comparing the de-encrypted customer number to the customer's unique number in clear format to verify that they match;

(i) logging an error if the de-encrypted customer number does not match the customer's unique number in clear format;

(j) retrieving the customer's velocity file if the de-encrypted encryption key matches the encryption key in clear format;

(k) verifying that the customer request does not violate any customer specified transaction limits contained in the velocity file;

(l) logging an error if the customer request violates any customer specified transaction limits;

(m) retrieving the merchant's encryption key and unique number if no violation of the velocity file is encountered;

(n) using the merchant's unique encryption key to re-encrypt the customer request; and (o) transmitting the re-encrypted message to the merchant.

2. The method according to claim 1 further comprising the steps of:

(a) verifying that the message request originated from an authorized customer; and (b) processing the message request to determine if it requires special processing.

3. The method according to claim 1 wherein said customer request contains customer specific credit information and said velocity file contains credit limit information for the customer.

4. The method according to claim 1 wherein the merchant received the re-encrypted message and further comprising the steps of:

(a) using the merchant's unique encryption key to de-encrypt the message;

(b) verifying that the customer request originated from an approved customer of the merchant; and (c) transmitting an acknowledge signal to the customer via the network indicating the customer request was received.

5. A system for securely transmitting a customer request for goods and/or services over the Internet using unique customer specific encryption keys and associated customer numbers, said encryption keys delivered to a customer over a non-Internet transmission channel, the system comprising:

a computing means running at least one application program for creating encrypted electronic messages using a customer's unique encryption key, said encrypted electronic messages containing the customer's encryption key, the customer's unique customer number and a customer request;

an Internet access means coupled to said computing means;

a switch configured to intercept said encrypted electronic messages, said switch communicably accessible to said computing means using said Internet access means, said switch comprising the following:

a customer database containing a plurality of key generation and distribution data;

a de-encryption means for receiving encrypted messages from said computing means and producing de-encrypted customer requests;

a validity checking means coupled to said de-encryption means for receiving the de-encrypted customer requests and further configured to compare data contained in such requests against the key generation and distribution data contained in the customer database; and an encryption processor communicably attached to the validity checking means for encrypting messages prior to transmission on the Internet; and a plurality of merchant terminals coupled to said switch via the Internet.

* * * * *